: 3,015,606
DINITROBENZAMIDE REMEDIES FOR COCCIDIOSIS AND SALMONELLA INFECTIONS
Arthur W. Walde, Charles City, Iowa, assignor to Dr. Salsbury's Laboratories, a corporation of Iowa
No Drawing. Filed July 2, 1956, Ser. No. 595,115
9 Claims. (Cl. 167—53.1)

This invention relates to veterinary preparations and is particularly concerned with the prophylactic treatment and control of avian infections of protozoan and bacterial origin.

Poultry, such as chickens and turkeys are susceptible to multiple diseases of highly contagious nature which cause severe economic losses in terms of stunted growth, reduced egg production and high mortality. One of the most prevalent protozoan infections in fowl is coccidiosis. It is caused by a variety of pathogenic organisms among which *Eimeria tenella* and *Eimeria necatrix* rank as the most devastative species. These parasites multiply in the digestive tract of the animals, especially in the linings of the intestines, producing a severe inflammation of the tissues. Depending upon the extent of the infection the birds may manifest various symptoms, such as mild to severe bowel disorders, emaciation, hemorrhage and anemia, with a substantial portion of resulting fatalities.

Another group of communicable and partly congenital poultry disorders comprises pullorum disease, fowl typhoid and paratyphoid. Their causative agents are salmonellae which belong to the colon-typhoid-dysentery type of bacteria. The organisms live in the bodies of warm-blooded animals and are frequently present in contaminated food and water which are consumed by their hosts.

Pullorum disease is a world-wide problem in poultry husbandry and causes great economic damage. It is produced by *Salmonella pullorum* and affects chicks and mature poultry alike. Mortality in young birds may attain a rate as high as 85%. In the infected chicks which survive there is generally found impairment of growth, fertility and productivity as a result of the infection. Many of the surviving birds become permanent carriers and transmit the parasite to their offspring. The cycle of infection begins with the hatching of the infected eggs which were laid by the diseased hen; many of the infected embryos die prior to hatching. Those which are infected during the hatching period frequently die in the first three or four weeks of their life. A great number of survivors remain infected and pass the disease to progeny and contacts. The disease is also spread from chick to chick and from adult birds to the baby chicks through contaminated food, water, litter, etc., through incubator and brooder transmission. It is likewise disseminated throughout the farmyard by contaminated soil.

Fowl typhoid is attributable to *Salmonella gallinarum*. It is a septicemic disease, afflicting primarily chickens. It is transmitted by feed, drinking water and droppings from infected fowl and is particularly severe in the broiler-raising areas. All ages and breeds may be affected. Losses begin at hatching time and continue through the laying period at a rate up to 70% of the flocks.

Paratyphoid is caused by *Salmonella typhimurium* and strikes mainly turkeys. When permitted to reach epizootic proportions, the disorder may result in fatalities up to 40% of a turkey poult population.

The common characteristic of salmonella infections is their insidious and lingering nature and the absence of specific clinical symptoms which can be readily identified to establish an early diagnosis. The birds display merely general signs of sickness, such as drooping of the wings, ruffled feathers, diarrhea, pasting of the vent and huddling. Sometimes the first indication of salmonella trouble in a flock is the sudden discovery of a number of dead birds in the chicken yard. Not even an autopsy reveals sufficiently characteristic pathological lesions and the only dependable diagnosis consists in the isolation and bacteriological identification of the causative agent. The infection is frequently dormant and the most dangerous carriers are birds or other animals which have apparently recovered from the disease, but still retain the infectious organism. A flock owner may not be aware of the presence of these infective carriers harboring the bacteria and spreading them in various ways.

The control and eradication of protozoan and salmonella diseases constitutes a serious problem to the poultry industry. The problem is aggravated by the fact that a flock is often afflicted by multiple infections at the same time. An outbreak of coccidiosis, for instance, may lower the resistance of the birds so as to make them an easy prey to a latent salmonella infection. This potential danger may be increased by the presence of unrecognized carriers to which the flock is exposed.

To deal effectively with this problem, a universal prophylactic treatment directed to all the aforesaid diseases at the time of suspected exposure or initial clinical manifestations would be desirable. While the field of coccidiostatics has been enriched by a number of new and valuable remedies during the last years, only few satisfactory drugs are available for combatting salmonella infections in their early stages. A major shortcoming in the use of these remedies, however, lies in the fact that their application is limited to no more than one specific type of infection. As is commonly known to those skilled in the veterinary arts, strict host- and drug-specificity in chemotherapeutic responsiveness is the general rule. A drug that is helpful in combatting the causative organism of one protozoan disease, is most frequently ineffective in the control of a different protozoan and much less of bacterial parasites, while bacteriostatics are even more selective with respect to pathogenic targets. Likewise, the same or closely related microorganisms, when harbored in different hosts, will not be equally affected by the same pharmacological agent. Accordingly, a fully expedient and adequate preventive therapy against coccidiosis and salmonella infections would require the concurrent administration of several specific drugs which, however, are liable to produce a cumulative toxic effect in the treated animals, especially in very young chickens and in poults. As a second contingency, the chemotherapeutic result of several remedies so dispensed may altogether be neutralized by mutual incompatibility and counteraction.

It has been discovered that despite the aforementioned highly specific and sensitive relationship between the chemical structure of a drug and the susceptivity of a parasite in its host environment there exists a group of compounds which is capable of being applied against more than one species of infection. More particularly a new series of drugs has been found which will effectively attack and prophylactically control both coccidiogenic protozoa and salmonella organisms, so that only one single remedy need be administered for a timely and preventive treatment of coccidiosis, pullorum disease, typhoid and paratyphoid in fowl. The multipurpose use of these compounds in combatting these coincident diseases caused by different parasites makes them of particularly outstanding value in the field of veterinary medicine.

The novel drugs include 3,5-dinitrobenzamide and certain derivatives thereof and may best be illustrated by the following chemical configuration

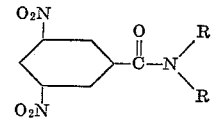

wherein R stands for hydrogen or a monovalent lower alkyl- or alkenyl radical having no more than four carbon atoms. In accordance with this definition the lower alkyl radicals within the purview of this invention basically comprise the methyl-, ethyl-, propyl-, and butyl groups, as well as their isomeric configurations. In the di-N-substituted derivatives both R's may be either of the same or of different structure. R may also stand for olefinic radicals having no more than four carbons, as exemplified by vinyl, allyl, and butenyl. Finally the alkyl- and alkenyl residues may be substituted by hydroxy- or alkoxy groups, provided, however, that such groups will not increase the total number of carbon atoms beyond four in any one of the hydrocarbon chains of the amido moiety. Wherever the term alkyl or alkenyl is used in the specification and the appended claims, it should be construed to include both the simple and the hydroxy- or alkoxy-substituted forms of these radicals.

Examples of the compounds within the scope of the invention are:

3,5-dinitrobenzamide
N-methyl-3,5-dinitrobenzamide
N,N-dimethyl-3,5-dinitrobenzamide
N-ethyl-3,5-dinitrobenzamide
N,N-diethyl-3,5-dinitrobenzamide
N-methyl, N-ethyl-3,5-dinitrobenzamide
N-n-propyl-3,5-dinitrobenzamide
N-isopropyl-3,5-dinitrobenzamide
N,N-di-n-propyl-3,5-dinitrobenzamide
N-2-hydroxyethyl-3,5-dinitrobenzamide
N-beta-methoxyethyl-3,5-dinitrobenzamide
N-allyl-3,5-dinitrobenzamide
N,N-diallyl-3,5-dinitrobenzamide
N-vinyl-3,5-dinitrobenzamide
N,N-divinyl-3,5-dinitrobenzamide
N-n-butyl-3,5-dinitrobenzamide
N-sec butyl-3,5-dinitrobenzamide
N-isobutyl-3,5-dinitrobenzamide
N-n-butenyl-3,5-dinitrobenzamide
N-di-n-butenyl-3,5-dinitrobenzamide The compounds of the invention may be conveniently prepared by reacting a 3,5-dinitrobenzoylhalide with ammonia or the desired amine in accordance with standard procedure. In the synthesis of the N-mono-methyl derivative of 3,5-dinitrobenzamide the methyl- or ethylester of 3,5-dinitrobenzoic acid can be employed to good advantage in place of the corresponding halide.

The new bacteriostatic and coccidiostatic remedies are administered to exposed or infected birds in combination with any solid, inert and non-toxic vehicle in which the compounds are homogeneously dispersed. Inactive carriers of suitable nature are any kind of vegetable food material such as ground corn, corn meal, dried distiller's grain, citrus meal, ordinary grain, mash, scratch and similar commercial rations which are placed before the birds for consumption ad libitum. To facilitate the handling of the small amounts of the chemicals to be incorporated into the vehicle of administration, a premix of the active ingredients may first be compounded with a limited quantity of the inert material so as to produce a stock concentrate. Instead of edible carriers, other non-toxic vehicles such as ground oyster shells or clays may be used for compounding the premix. A proportionate amount of this concentrate is then diluted with the edible carrier until a uniform blend of the desired dosage strength is obtained.

The compounds may also be used as active ingredients in liquid compositions which can be conveniently prepared by means of wetting agents and emulsifiers. A preferred embodiment is a drinking water suspension for imbibition.

The new drugs are principally intended for prophylactic purposes. As previously stated, all young chicks and poults are potential germ carriers of salmonella infections through transmission of the breeding female by way of the egg. The young birds so congenitally infected may be incubationary carriers the major part of which will succumb as soon as pathogenesis runs its full course. Those which survive will become convalescent carriers, still harboring and disseminating the infectious organisms, while even the small minority which might never show any symptoms remains a constant source of danger as contact carriers. Since the post-hatching period is the most critical time for the disorder, treatment with our new remedies should be instituted during the first days of age and continued for about three weeks as a matter of precaution. Also, whenever any perceptible changes in the well-being of a flock appear, a feed ration or drinking potion medicated with the compounds is indicated to prevent an outbreak or spread of major proportions. Simultaneously therewith a prophylactic effect against latent coccidiosis infection will be accomplished. When an impending outbreak of coccidiosis in a mature flock is suspected by reason of exposure or the sporadic appearance of the first clinical symptoms of the disease, our new remedies are administered to the birds for 11–14 days, but treatment may be extended for a longer period, if the infection is of more serious nature.

The minimum effective dosage of the compounds for the prophylactic control of coccidiosis has been found at 0.0125% by weight of the medicated feed ration which is equivalent to 125 parts per million. It corresponds to a daily drug intake of approximately 6.3 mg. to 17 mg. per kg. body weight depending upon the age and weight of the bird. Thus a two week old chicken weighing about 90 gm. and consuming approximately 12.15 gm. of feed per day will have a daily drug intake of about 17 mg./kg. body weight when treated with a medicated ration having a dosage strength of 0.0125%. At the same level, a twelve week old animal weighing close to 1500 gm. and having a daily feed consumption of 77.11 gm. will ingest only 6.3 mg. of the compound per kg. body weight per day, and the daily drug intake per kg. body weight of a four week old chicken will be about 14.7 mg. Higher concentrations up to 1% may be indicated for curative purposes after an infection has taken hold and spread over a considerable area of a poultry colony. A one percent concentration would provide a maximum of 1350 milligrams per kilogram of body weight with a two-week old chick using the same basis as explained above.

For *Salmonella pullorum* and *Salmonella gallinarum* infections in chickens the preventive minimum dosage lies at a feed concentration of 0.05% corresponding to 500 parts per million. This amounts to a daily kg./B.W. dose of 134 mg. of the compound for a one day old chick and about 38 mg./kg./B.W. for a 7 to 8 week old bird. These dosages can be increased up to 0.1% in baby chicks and up to 0.5% in mature birds when a notable incidence of fatalities signifies a heavy infection of a flock.

The prevention and control of paratyphoid in chickens and turkeys requires a minimum medication strength of 0.075% which can be raised to 0.15% and even more in severe cases. Since baby chicks and poults are primarily subject to the disease, prophylactic therapy should start on the first day of age.

The utility of the new remedies will be illustrated by a series of tests against the aforementioned pathogenic parasites of coccidiosis and salmonellosis; the activity of the drugs will be evaluated and expressed in terms of comparative mortality rates between treated and untreated birds which have been exposed to the infection by artificial inoculation.

Table I is a representative summary of experimental data on the coccidiostatic effect of 3,5-dinitrobenzamide and is alkyl- and alkenyl-derivatives. The two most prevalent causative factors of the disease, *Eimeria tenella* and *Eimeria necatrix* were investigated. For every test run two infected groups of New Hampshire chickens, 4–5 weeks of age, were placed under observation. For artificial infection each animal received a single dose of 100,000 sporulated oöcysts of *Eimeria tenella* and *Eimeria necatrix* respectively. One group of each run was given a feed ration containing a therapeutically effective, non-toxic dose of the drugs for consumption ad libitum, while the other group was left without medication and served as control. Treatment was initiated three days prior to inoculation by the two infective organisms and continued for a total of 11–14 days, at the end of which the chemotherapeutic value of the compounds was assessed and recorded.

day old chicks. In every experiment two groups of New Hampshire chicks were artificially infected with 0.25 ml. of a 24-hour culture broth of the organism; the procedure causes mortality and pathological symptoms within three to seven days. One of the infected groups in each test was placed under medication, while the other was left untreated and served as control. Medication was started three days before inoculation and was continued for

TABLE I

| No. | Medication | Conc. in Feed | Mortality, percent | | | |
|---|---|---|---|---|---|---|
| | | | E. tenella | | E. necatrix | |
| | | | Treated | Untreated | Treated | Untreated |
| 1 | 3,5-Dinitrobenzamide | 0.0125 | 0 | 50 | | |
| 2 | | 0.0200 | | | 0 | 75 |
| 3 | | 0.0200 | | | 0 | 50 |
| 4 | | 0.0250 | 0 | 50 | 0 | 50 |
| 5 | | 0.0250 | | | 0 | 66 |
| 6 | | 0.0250 | | | 0 | 50 |
| 7 | | 0.0500 | 0 | 50 | 0 | 75 |
| 8 | | 0.1000 | | | 0 | 50 |
| 9 | | 0.2000 | | | 0 | 50 |
| 10 | | 0.0125 | 25 | 100 | 0 | 50 |
| 11 | N-Methyl- | 0.0150 | 0 | 100 | | |
| 12 | | 0.0200 | 0 | 100 | 0 | 50 |
| 13 | | 0.0250 | 0 | 100 | 0 | 100 |
| 14 | | 0.0500 | 0 | 100 | 0 | 100 |
| 15 | | 0.1000 | 0 | 100 | | |
| 16 | | 0.2500 | 0 | 100 | | |
| 17 | | 0.5000 | 0 | 100 | | |
| 18 | N-Ethyl- | 0.0250 | 0 | 75 | 0 | 50 |
| 19 | | 0.0500 | 0 | 75 | 0 | 50 |
| 20 | | 0.1000 | 0 | 75 | 0 | 75 |
| 21 | | 0.2500 | 0 | 75 | 0 | 75 |
| 22 | N,N-Diethyl- | 0.0500 | 0 | 75 | 0 | 50 |
| 23 | | 0.1000 | 0 | 75 | 0 | 50 |
| 24 | | 0.2500 | 0 | 75 | 0 | 50 |
| 25 | N-n-Propyl- | 0.0500 | 0 | 50 | 0 | 50 |
| 26 | | 0.1000 | 0 | 50 | 0 | 50 |
| 27 | | 0.2500 | | | 0 | 50 |
| 28 | N-Isopropyl- | 0.0500 | 0 | 50 | 0 | 50 |
| 29 | | 0.1000 | 0 | 50 | 0 | 50 |
| 30 | | 0.2500 | 0 | 50 | 0 | 50 |
| 31 | N,N-Dimethyl- | 0.0500 | 0 | 100 | 0 | 75 |
| 32 | | 0.1000 | 0 | 100 | 0 | 75 |
| 33 | | 0.2500 | 0 | 100 | 0 | 75 |
| 34 | | 0.5000 | | | 0 | 75 |
| 35 | N-2-Hydroxyethyl- | 0.0500 | 0 | 50 | 0 | 50 |
| 36 | | 0.1000 | 0 | 50 | 0 | 50 |
| 37 | | 0.2000 | 0 | 50 | 0 | 50 |
| 38 | N-beta-Methoxyethyl- | 0.1000 | 0 | 50 | 0 | 50 |
| 39 | | 0.2500 | 0 | 50 | 0 | 50 |
| 40 | | 0.5000 | 0 | 50 | 0 | 50 |
| 41 | N-Allyl- | 0.0500 | 0 | 100 | | |
| 42 | | 0.5000 | | | 0 | 75 |
| 43 | N,N-Diallyl- | 0.1000 | 0 | 100 | 0 | 75 |
| 44 | | 0.1000 | 0 | 50 | 0 | 50 |
| 45 | | 0.2500 | 0 | 50 | 0 | 50 |
| 46 | N-n-Butyl- | 0.1000 | 0 | 50 | | |
| 47 | | 0.2000 | 0 | 50 | | |
| 48 | N-sec Butyl- | 0.0500 | 0 | 25 | | |
| 49 | | 0.1000 | 0 | 25 | | |
| 50 | | 0.2500 | 0 | 25 | | |
| 51 | N-Isobutyl- | 0.1000 | 0 | 25 | | |
| 52 | | 0.5000 | 0 | 25 | | |
| 53 | | 1.0000 | 0 | 25 | | |

Table II shows the effect of 3,5-dinitrobenzamide and its derivatives on *Salmonella pullorum* infections in one

TABLE II

| No. | Medication | Conc. in Feed | Mortality percent | |
|---|---|---|---|---|
| | | | Treated | Untreated |
| 1 | 3,5-Dinitrobenzamide | 0.0500 | 2 | 36 |
| 2 | | 0.0500 | 4 | 36 |
| 3 | | 0.0750 | 6 | 36 |
| 4 | | 0.1000 | 0 | 28 |
| 5 | | 0.1000 | 4 | 36 |
| 6 | | 0.1500 | 4 | 40 |
| 7 | | 0.1500 | 7 | 93 |
| 8 | | 0.1500 | 7 | 60 |
| 9 | N-Methyl- | 0.0500 | 10 | 36 |
| 10 | | 0.0750 | 8 | 36 |
| 11 | | 0.1000 | 6 | 36 |
| 12 | N,N-Dimethyl- | 0.1000 | 3 | 60 |
| 13 | | 0.1000 | 10 | 60 |
| 14 | | 0.2000 | 3 | 60 |
| 15 | | 0.2000 | 3 | 60 |
| 16 | N-Ethyl- | 0.0500 | 13 | 60 |
| 17 | | 0.1000 | 10 | 60 |
| 18 | N-beta-Hydroxyethyl- | 0.1000 | 7 | 60 |

21 days. No toxic effects were observed at any dosage level. A comparison of the mortality rates between treated and untreated birds reflects the bacteriostatic efficacy of the various compounds at different concentrations.

Table III is a summary of test data on the effect of the remedies against typhoid infection. New Hampshire chickens ranging in age from one day to 12 weeks were used in this experiment as indicated in the table. Parallel test and control groups were artificially infected with a 24-hour culture broth of *Salmonella gallinarum*. The one day old baby chicks received 0.25 ml. and the older birds 1.0 ml. of the infective inoculum. Medication was begun three days before infection, with the exception of test No. 10 in which the treatment started on the day of infection, and test No. 11 in which it was instituted four days after infection. A comparison of the mortality figures between treated and untreated groups manifests the strong prophylactic activity of the compounds.

TABLE III

| No. | Medication | Age | Conc. in Feed | Mortality, percent Treated | Mortality, percent Untreated |
|---|---|---|---|---|---|
| 1 | 3,5-Dinitrobenzamide | 7 weeks | 0.0500 | 4 | 49 |
| 2 | | 8 weeks | 0.0500 | 16 | 72 |
| 3 | | 1 day | 0.0500 | 4 | 96 |
| 4 | | do | 0.0750 | 6 | 96 |
| 5 | | 8 weeks | 0.1000 | 4 | 72 |
| 6 | | 6 weeks | 0.1000 | 0 | 93 |
| 7 | | 1 day | 0.1000 | 6 | 96 |
| 8 | | 8 weeks | 0.1500 | 0 | 36 |
| 9 | | 6 weeks | 0.1500 | 0 | 75 |
| 10 | | 9 weeks | 0.1500 | 0 | 75 |
| 11 | | do | 0.1500 | 0 | 75 |
| 12 | N-Methyl- | 8 weeks | 0.0750 | 8 | 72 |
| 13 | | do | 0.1000 | 12 | 72 |
| 14 | | 12 weeks | 0.3000 | 0 | 75 |
| 15 | | do | 0.5000 | 0 | 100 |
| 16 | N-Ethyl- | 8 weeks | 0.1000 | 25 | 100 |
| 17 | | do | 0.2000 | 0 | 100 |
| 18 | N,N-Diethyl- | 8 weeks | 0.5000 | 0 | 100 |
| 19 | N-beta-Hydroxyethyl- | do | 0.5000 | 0 | 100 |
| 20 | N-beta-Methoxyethyl- | do | 0.5000 | 0 | 100 |
| 21 | N-Propyl- | do | 0.5000 | 0 | 100 |
| 22 | N-Butyl- | do | 0.5000 | 0 | 100 |
| 23 | N-Allyl- | do | 0.2500 | 0 | 100 |

Table IV shows three tests conducted with 3,5-dinitrobenzamide on paratyphoid-infected one-day old chicks and Broad Breasted Bronze turkey poults. The baby chicks were of the New Hampshire variety. The infective organism, *Salmonella typhimurium*, was introduced into the animals by the same method as in the preceding example. Medication was started three days before inoculation and continued for a period of 21 days. A comparison of the mortality figures found for the treated animals and the controls indicates the high chemoprophylactic efficacy of the compound when used in the starting feed of the birds infected with the bacillus at their most susceptible age.

TABLE IV

| No. | Host | Conc. in Feed | Mortality, percent Treated | Mortality, percent Untreated |
|---|---|---|---|---|
| 1 | New Hampshire chick | 0.1500 | 7 | 76 |
| 2 | Broad Breasted Bronze turkey poult. | 0.0750 | 10 | 60 |
| 3 | do | 0.1000 | 0 | 60 |

While the invention has been illustrated by the foregoing examples, it will be apparent that various equivalent changes and modifications may be resorted to in carrying out the invention without departing from the scope and spirit thereof, and it will be understood that such equivalent embodiments are within the purview of the annexed claims.

I claim:

1. A veterinary composition comprising an orally ingestible nontoxic vehicle and a small, but effective nontoxic amount of a compound represented by the general formula

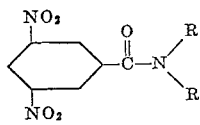

wherein R is selected from the group consisting of hydrogen, alkyl, alkenyl, hydroxy-substituted alkyl, alkoxy-substituted alkyl, hydroxy-substituted alkenyl, and alkoxy-substituted alkenyl radicals having no more than 1 to 4 carbon atoms, said compound being present in an approximate amount between 0.0125% and 0.5% by weight of the composition.

2. A veterinary composition in accordance with claim 1 wherein the orally ingestible vehicle is a drinking water preparation.

3. An animal feed containing about 0.0125% to 0.5% by weight of a compound represented by the general formula

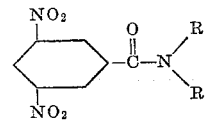

wherein R is selected from the group consisting of hydrogen, alkyl, alkenyl, hydroxy-substituted alkyl, alkoxy-substituted alkyl, hydroxy-substituted alkenyl, and alkoxy-substituted alkenyl radicals having no more than 1 to 4 carbon atoms.

4. An animal feed in accordance with claim 3 in which the active ingredient is 3,5-dinitrobenzamide.

5. An animal feed in accordance with claim 3 in which the active ingredient is N-methyl-3,5-dinitrobenzamide.

6. An animal feed in accordance with claim 3 in which the active ingredient is N-ethyl-3,5-dinitrobenzamide.

7. An animal feed in accordance with claim 3 in which the active ingredient is N-2-hydroxy-ethyl-3,5-dinitrobenzamide.

8. An animal feed in accordance with claim 3 in which the active ingredient is N-beta-methoxy-ethyl-3,5-dinitrobenzamide.

9. In the practice of animal husbandry, the method which comprises orally administering to animals a compound represented by the general formula

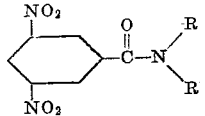

wherein R is selected from the group of hydrogen, alkyl, alkenyl, hydroxy-substituted alkyl, alkoxy-substituted alkyl, hydroxy-substituted alkenyl, and alkoxy-substituted alkenyl radicals having no more than 1 to 4 carbon atoms, said compound being employed in a daily amount within the range of from approximately 6 to approximately 1400 mg. per kg. body weight.

References Cited in the file of this patent

Chemical Abstracts, vol. 41, 1947, pages 3902D and 3909i.